July 28, 1942. W. S. CLEAVES 2,291,278
TEA OR COFFEE BAG
Filed May 13, 1939 2 Sheets-Sheet 1
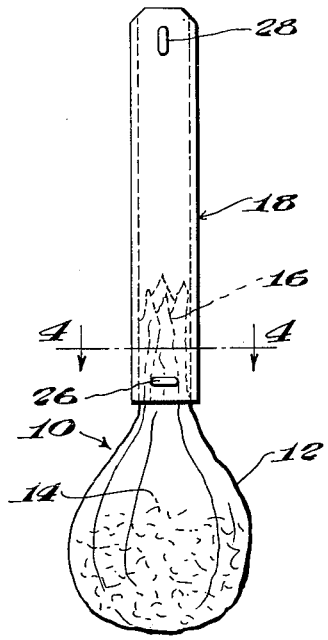
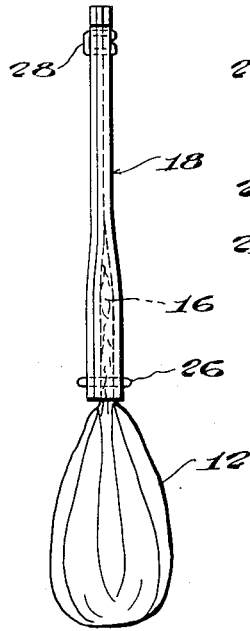
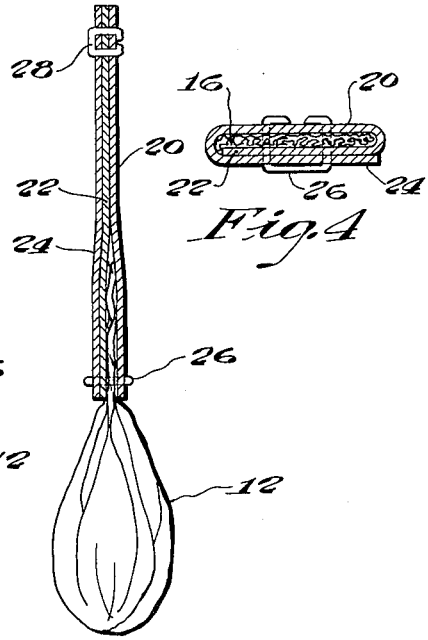
Fig.1  Fig.2  Fig.3  Fig.4
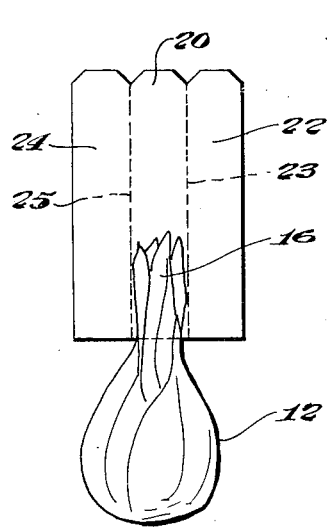
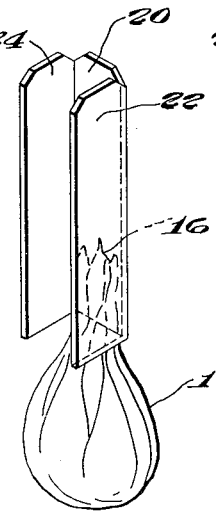
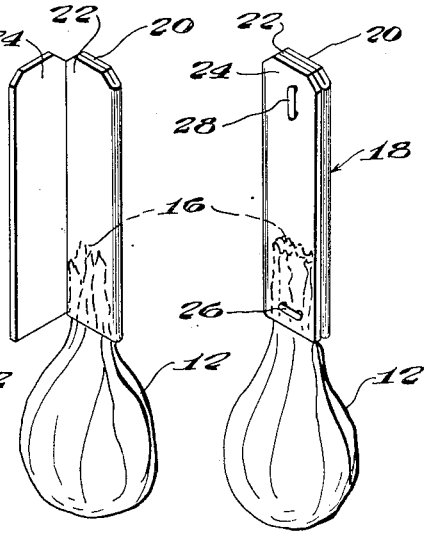
Fig.5  Fig.6  Fig.7  Fig.8
INVENTOR
William S. Cleaves
BY J. Stanley Churchill
ATTORNEY July 28, 1942.  W. S. CLEAVES  2,291,278
TEA OR COFFEE BAG
Filed May 13, 1939  2 Sheets-Sheet 2
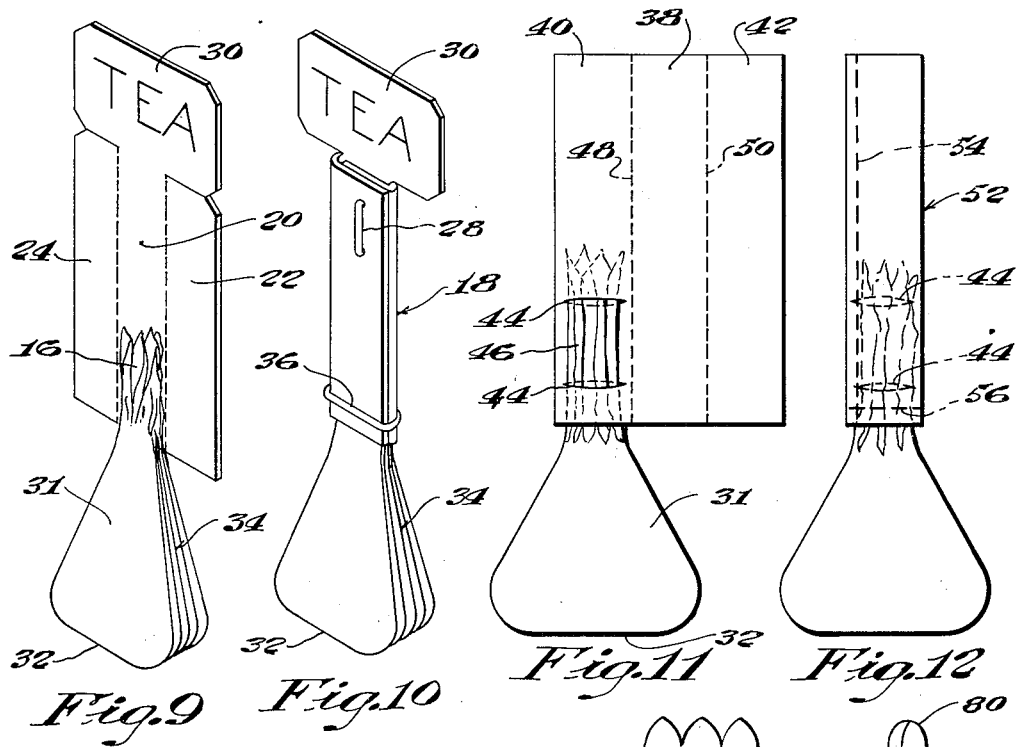
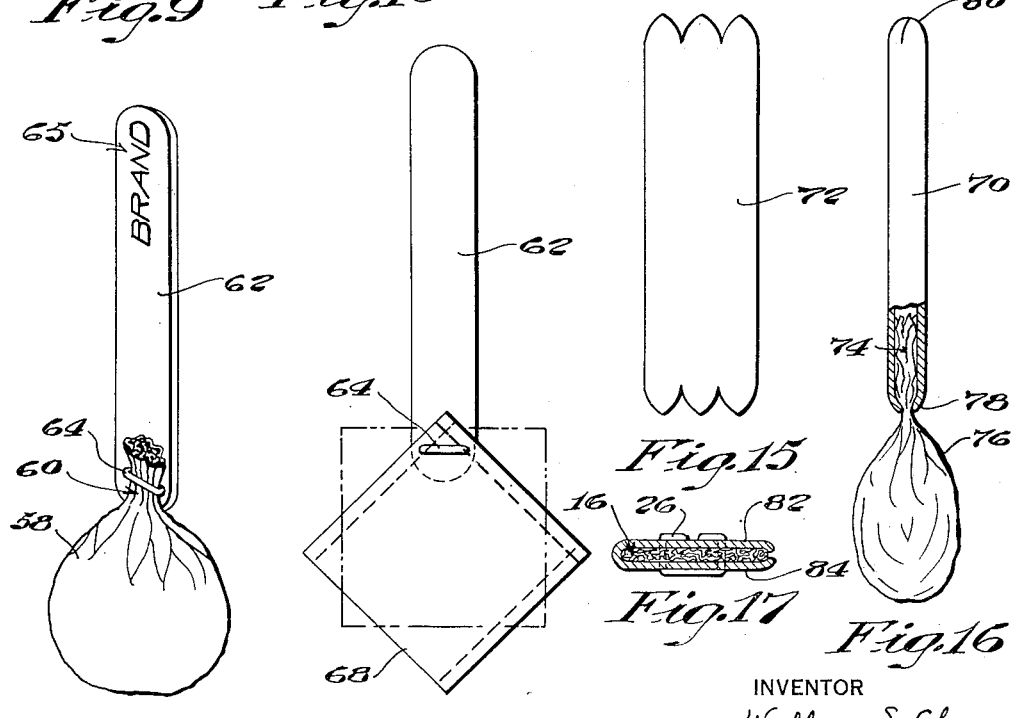
INVENTOR
William S. Cleaves
BY J. Stanley Churchill
ATTORNEY Patented July 28, 1942

2,291,278

UNITED STATES PATENT OFFICE 2,291,278

TEA OR COFFEE BAG

William S. Cleaves, Wollaston, Mass., assignor to Pneumatic Scale Corporation, Limited, Quincy, Mass., a corporation of Massachusetts Application May 13, 1939, Serial No. 273,477

10 Claims. (Cl. 99—77.1)

This invention relates to a tea or coffee bag.

In general the object of the invention is to provide a novel tea or coffee bag having a novel and improved structure of handle which forms a substitute for the usual string and tag now commonly employed in the manufacture of commercial tea and coffee bags, and by which the utility of the tea or coffee bag is substantially increased, particularly with respect to the ease with which the desired infusion of the tea or coffee may be caused to take place, and the ease with which the tea or coffee bag may be handled by the user.

With this general object in view and such others as may hereinafter appear, the invention consists in the tea or coffee bags hereinafter described and particularly defined in the claims at the end of this specification.

In the drawings, Fig. 1 illustrates a front elevation of the preferred form of tea or coffee bag embodying the present invention; Fig. 2 is a side view of the bag shown in Fig. 1; Fig. 3 is a similar view showing the handle in cross-section; Fig. 4 is an enlarged cross-sectional view through the handle, taken on the line 4—4 of Fig. 1; Fig. 5 is a view in front elevation; Figs. 6 to 8 are perspective views illustrating the manner in which the bag shown in Fig. 1 may be produced; Figs. 9 and 10 are similar views illustrating a modification of the tea or coffee bag shown in Fig. 1 embodying an advertising tab as an integral part of the handle; Figs. 11 and 12 illustrate another modification of the tea or coffee bag showing a different structure of handle; Fig. 13 is a perspective view and Fig. 14 is a front elevation showing other modifications of the tea or coffee bag to be referred to; Fig. 15 is a developed view of a blank of material employed in producing still another modification shown in Fig. 16; Fig. 16 is a view in side elevation and partly in cross-section illustrating a modified form of the tea or coffee bag; and Fig. 17 is a plan view, in cross-section, of a modified form of the handle, to be referred to.

In general the present invention contemplates a construction of tea or coffee bag in which the handle of the tea or coffee bag comprises a structure having sufficient rigidity to enable the tea or coffee bag to be manipulated in a manner similar to a spoon. At the present time, as is well known, the commercial form of tea or coffee bags embody a bag of gauze or porous paper containing a quantity of the tea or coffee, and a handle portion comprising a string and a tag secured to the bag. In the use of the bag the operator grasps the handle and suspends the bag in the hot water to effect the desired fusion of the tea or coffee. After the fusion has been completed the satisfactory and convenient disposition of the used bag presents somewhat of a problem, and one of the features of the present invention resides in the provision of a handle of at least a semi-rigid nature by which the operator may dispose the used bag in the saucer in the manner analogous to a spoon. The present structure of handle assists in the fusion of the tea and may be used as a muddler.

In practice the handle of the present bag may take various forms, preferably a semi-rigid structure produced by folding thin cardboard longitudinally of the handle to form a plurality of over-folded portions, and provision is made for securing the filled bag to the handle by a staple or by stitching, or in other convenient manner as will be described. The bag containing the tea or coffee may take various forms and a portion of the bag secured within the over-folded portions of the handle. When produced in the form of a pouch type of bag, the gathered together mouth of the bag is preferably embraced within the over-folded portions of the handle and secured to the handle by fastening means preferably extended through the over-folded portions and through the portion of the mouth of the bag projecting within the same. In some instances I may prefer to construct the handle of sheet metal, preferably by folding a blank into a hollow elongated shape, and I may secure the filled bag of the tea bag by clamping one end of the hollow portion of the handle into firm engagement with the mouth or other suitable portion of the bag. In other instances I may prefer to form the handle of rigid material, such as heavier cardboard, or even of wood, in which case the bag is preferably secured to one end portion of the handle by a staple or other suitable fastening means.

Referring now to the drawings, as shown in Figs. 1 to 8, 10 represents a tea or coffee bag comprising a pouch type bag 12 which may be formed in the usual manner from a rectangular sheet of material, such as gauze or porous paper, by depositing a charge of the commodity 14 onto the blank and by gathering together the free edges of the bag forming material to produce a mouth portion 16. In the preferred embodiment of the invention the mouth portion 16 of the bag is enveloped within a handle 18 which may preferably comprise an elongated strip of thin fibre board having a back portion 20 and two side flaps or wing portions 22, 24 arranged to be folded over upon the score lines 23, 25 and wrapped about the mouth portion 16 of the bag in overlapping relation to form a unitary closure and handle for the bag. Provision is made for securing together the overlapping portions of the handle and for securing the mouth of the bag thereto. The bag may and preferably will be provided with a staple 26 for securing the gathered together mouth portion of the bag to the handle and, as herein shown, the staple will preferably extend through the over-folded portions 20, 22, 24 and through the mouth portion 16 of the bag embraced within the same. A second staple 28 may also be provided to secure together the overlapping portions at the upper end of the handle. In practice, the handle may preferably be composed of a relatively rigid or semi-rigid material capable of holding its shape after being immersed in the hot water during the infusion process and preferably having characteristics such as to render the handle odorless and tasteless to prevent any objectionable qualities being imparted to the brew. Such materials may include a relatively thin and substantially rigid fibre board or the heavier sheets of "Cellophane" and may be made in different colors, to identify different brands of tea. Other materials which may be used include sheet metal or wood, as will be described with reference to the modifications herein shown. Likewise, the bag forming material may comprise any of the usual materials now commonly used, such as cloth, a high wet strength filter paper, or perforated parchment paper. Various forms of fastening devices may also be employed in lieu of the staple fastening, and such fastenings may include sewing, odorless and tasteless glue of which any usual or preferred composition may be used, or interweaving and interlocking the mouth portion and the handle with or without the use of other securing means.

As illustrated in Figs. 9 and 10, a modified form of the handle may include an advertising tab 30 which may extend from and form a part of the back portion 20. The advertising tab may and preferably will be of the same width as the developed blank of the handle, including the wing portions 22, 24 in order that the handle and the tab may be conveniently and economically produced by dieing operations from a sheet or web of the material. A modified form of bag structure is illustrated in Figs. 9 to 12 inclusive, which may comprise a substantially flat bag 31 having a wide base 32 and tapering upwardly toward the mouth portion 16. The narrower ends of the bag are provided with pleats 34 leaving the front and rear faces of the bag substantially free of folds thereby producing a bag of neat appearance and capable of being conveniently packed. A modified form of fastening may be provided as shown in Fig. 10, which may comprise a metal band 36 such as a staple, extending around the outside of the handle and in firm engagement therewith so as to clamp the mouth portion 16 within the folds of the handle 18.

Referring now to Figs. 11 and 12, the modified form of handle structure therein illustrated may comprise an elongated strip of material having a back portion 38 and wing portions 40, 42, one of the wing portions 40, being provided with two or more slits 44 through which the elongated mouth portion 46 of the bag may be extended. In constructing the handle, the wing portion 40 is first folded over, on the scored line 48 and thereafter the wing portion 42 is folded over on the scored line 50 into overlapping relation with the wing portion 40 thereby entirely enveloping the mouth portion of the bag. The overlapping portions of the handle 52 thus formed may thereafter be secured in any usual manner such as by a staple or by an odorless and tasteless adhesive, or as herein illustrated, the bag may be completed by providing a series of stitches 54 along the longitudinal free edge of the handle and by stitching 56 across the lower portion of the handle to secure the bag and the handle together.

The modification of the present bag and handle illustrated in Fig. 13 may comprise a pouch type bag 58 of usual construction having a mouth portion 60 formed by gathering together the free edges of the bag forming material, and a handle 62 which may comprise an elongated strip of relatively heavy fibre board or a thin strip of wood. The mouth portion 60 of the bag is preferably secured to the handle 62 by a staple 64 which may be clamped over the overlapping folds of the mouth portion 60 and through the handle. The particular brand of the commodity may be stamped or printed upon the handle, as indicated at 65. If desired, the pouch bag may be completed in the usual manner by tying a piece of string or securing a band of metal around the neck thereof to close the mouth of the bag prior to fastening the single strip of material to form the handle. Fig. 14 illustrates a similar embodiment in which the tea or coffee bag 68 may be of the pillow or envelope type, produced by overfolding a rectangular blank of material holding a charge of the commodity, and sewing around the free edges of the bag. The pillow type bag may be secured to the handle 62 by a staple 64 passing through one corner of the bag, or as indicated by the dotted lines in Fig. 14, the bag may be secured to a mediate portion of one edge thereof. In this manner the present handle structure may be adapted to bags of both the pouch and pillow type produced on existing commercial machines.

In still another modification of the present invention, the handle for the bag may comprise an elongated tubular member 70, made of sheet metal preferably aluminum, which may be formed by rolling a blank 72 thereof about the gathered together mouth portion 74 of the bag 76 and thereafter clamping one end 78 of the tubular member into firm engagement with the mouth portion of the bag. The other end 80 of the handle may also be closed and rounded over, as shown, to produce a handle of neat appearance and rigid construction. As illustrated in Fig. 17, another modification of the handle 18 may comprise an elongated strip of cardboard having but two overlapping portions 82, 84 enveloping the mouth portion 16 of the bag, and secured by the staple 26.

From the above description of the construction of the present tea or coffee bag, it will be observed that the same may be used with advantage in making the brew since the relatively rigid handle enables the user to stir and press the bag to efficiently extract the liquor from the tea or coffee within the bag and to easily and conveniently dispose of the bag after use. The present structure of bag is also adapted to be economically produced by high speed automatic machines.

While the preferred embodiment of the invention has been herein illustrated and described, it will be understood that the invention may be embodied in other forms within the scope of the following claims.

Having thus described the invention, what is claimed is:

1. As a new article of manufacture, a bag for submerging in liquid to prepare a beverage by infusion comprising a bag having a mouth portion formed by gathering the free edges of the bag forming material, a beverage base within the bag, and a handle for the bag adapted to envelop said mouth portion to form a closure therefor, said handle comprising an elongated and substantially rigid strip having a back portion and two overlapping portions wrapped around said mouth portion, and fastening means for securing the bag to the handle.

2. As a new article of manufacture, a bag for submerging in liquid to prepare a beverage by infusion comprising a bag having a mouth portion formed by gathering together the free edges of the bag forming material, a beverage base within the bag, and a handle for the bag adapted to envelop said mouth portion to form a closure therefor, said handle comprising an elongated hollow and substantially rigid sheet metal member into one end portion of which said mouth portion of the bag is extended, said metal member being clamped into firm engagement therewith.

3. As a new article of manufacture, a bag for submerging in liquid to prepare a beverage by infusion comprising a bag having a mouth portion formed by gathering the free edges of the bag forming material, a beverage base within the bag, and a handle for the bag adapted to envelop said mouth portion to form a closure therefor, said handle comprising an elongated and substantially rigid strip having a back portion and an overlapping portion wrapped around said mouth portion, fastening means for securing the bag to the handle, and an advertising tab extending from and forming an integral part of said handle.

4. As a new article of manufacture, a bag for submerging in liquid to prepare a beverage by infusion comprising a bag having a mouth portion formed by gathering the free edges of the bag forming material, a beverage base within the bag, and a handle for the bag adapted to envelop said mouth portion to form a closure therefor, said handle comprising an elongated and substantially rigid strip having a back portion and an overlapping portion wrapped around said mouth portion, and fastening means for securing the bag to the handle, and an advertising tab for the handle extending from and forming a part of said back portion.

5. As a new article of manufacture, a bag for submerging in liquid to prepare a beverage by infusion comprising a bag having a mouth portion formed by gathering together the free edges of the bag forming material, a beverage base within the bag, a handle comprising an elongated strip of substantially rigid material and a fastening member comprising a staple arranged to be clamped over said mouth portion to form a closure therefor, and to extend through said strip to secure the bag to the handle.

6. As a new article of manufacture, a bag for submerging in liquid to prepare a beverage by infusion comprising a bag having a mouth portion formed by gathering together the free edges of the bag forming material, a beverage base within the bag, and a handle for the bag comprising a substantially rigid strip having a back portion and two wing portions, one of said wing portions being provided with at least one opening through which said mouth portion is extended to close the same, said wing portions being folded in overlapping relation to envelop said mouth portion and fastening means for securing the bag to the handle.

7. As a new article of manufacture, a bag for submerging in liquid to prepare a beverage by infusion comprising a pouch type bag having a mouth portion formed by gathering together the free edges of the bag forming material, a beverage base within the bag, a handle for the bag comprising an elongated and substantially rigid strip having a back portion and two overlapping wing portions arranged to be folded over said mouth portion to enclose the latter within the handle and to form a closure for the bag, and fastening means comprising a staple arranged to extend through said overlapping portions and said mouth portion to secure the bag to the handle.

8. As a new article of manufacture, a bag for submerging in liquid to prepare a beverage by infusion comprising a pouch type bag having a mouth portion formed by gathering together the free edges of the bag forming material, a beverage base within the bag, a handle for the bag comprising an elongated and substantially rigid strip having a back portion and two overlapping wing portions arranged to be folded over said mouth portion to enclose the latter within the handle and to form a closure for the bag, said bag being secured to said handle by a row of stitches.

9. As a new article of manufacture, a bag for submerging in liquid to prepare a beverage by infusion comprising a bag having a mouth portion formed by gathering together the free edges of the bag forming material, a beverage base within the bag, and a handle for the bag adapted to envelop said mouth portion to form a closure therefor, said handle comprising an elongated hollow and substantially rigid member into one end portion of which said mouth portion of the bag is extended and clamped into firm engagement therewith.

10. As a new article of manufacture, a bag for submerging in liquid to prepare a beverage by infusion comprising a pouch type bag having a mouth portion formed by gathering together the free edges of the bag forming material, a beverage base within the bag, a handle for the bag comprising an elongated and substantially rigid strip having a back portion and two overlapping wing portions arranged to be folded over said mouth portion to enclose the latter within the handle and to form a closure for the bag and a fastening member comprising a staple securing the bag to the handle.

WILLIAM S. CLEAVES.